United States Patent
Schönewolf

(10) Patent No.: US 12,466,269 B2
(45) Date of Patent: Nov. 11, 2025

(54) ABSORPTION CIRCUIT ARRANGEMENT FOR A TRACTION CONVERTER OF A RAIL VEHICLE

(71) Applicant: Siemens Mobility GmbH, Munich (DE)

(72) Inventor: Stefan Hans Werner Schönewolf, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/769,632

(22) Filed: Jul. 11, 2024

(65) Prior Publication Data

US 2025/0018803 A1 Jan. 16, 2025

(30) Foreign Application Priority Data

Jul. 11, 2023 (DE) .................. 10 2023 206 584.3

(51) Int. Cl.
*B60L 7/16* (2006.01)
*B60L 9/00* (2019.01)
(Continued)

(52) U.S. Cl.
CPC ............ *B60L 9/00* (2013.01); *B60L 53/24* (2019.02); *B60L 2200/30* (2013.01); *H02M 7/539* (2013.01)

(58) Field of Classification Search
CPC ........ B60L 9/00; B60L 53/24; B60L 2200/30; H02M 7/539
See application file for complete search history.

(56) References Cited

U.S. PATENT DOCUMENTS 8,188,807 B2  5/2012  Bakran et al.
2009/0322148 A1  12/2009  Kitanaka
(Continued)

FOREIGN PATENT DOCUMENTS

CN    1816462 A    8/2006
CN  116031859 A    4/2023
(Continued)

OTHER PUBLICATIONS

Galea et al., New Topology of Electronic Smoothing Inductor Used in Three Phase Electric Drives, Oct. 2011, pp. 1-6, 11th International Conference on Electrical Power Quality and Utilisation.
(Continued)

*Primary Examiner* — Rexford N Barnie
*Assistant Examiner* — Esayas G Yeshaw
(74) *Attorney, Agent, or Firm* — Laurence A. Greenberg; Werner H. Stemer; Ralph E. Locher

(57) ABSTRACT

An absorption circuit arrangement is for a traction converter of a rail vehicle. The traction converter has a first power converter, a second power converter, a DC link circuit connecting the first power converter and the second power converter with a first and a second voltage potential and a link circuit capacitance arranged in the DC link circuit. The absorption circuit arrangement is arranged in the DC link circuit and is connected in parallel with the link circuit capacitance and contains a switching arrangement having a switching unit and an inductance. Each switching unit contains two terminals, two controllable power semiconductor switches and a switching unit capacitance and is configured, dependent upon switching settings of the power semiconductor switches, to provide at least two different voltages at the terminals.

19 Claims, 10 Drawing Sheets

(51) Int. Cl.
  *B60L 53/24* (2019.01)
  *H02M 7/539* (2006.01)

(56) References Cited

U.S. PATENT DOCUMENTS

| | | | |
|---|---|---|---|
| 2015/0055387 A1 | 2/2015 | Tengner et al. | |
| 2018/0361878 A1* | 12/2018 | Akiyama | B61L 15/0058 |
| 2020/0047621 A1* | 2/2020 | Nakamura | G01M 17/08 |
| 2023/0147692 A1* | 5/2023 | Chen | H02J 50/12 |
| | | | 701/19 |
| 2023/0318441 A1 | 10/2023 | Schiedermeier | |
| 2024/0239385 A1* | 7/2024 | Mulligan | B60L 7/16 |

FOREIGN PATENT DOCUMENTS

| | | |
|---|---|---|
| CN | 116054542 A | 5/2023 |
| DE | 19712564 C1 | 6/1998 |
| DE | 102007006840 B3 | 4/2008 |
| DE | 102009017254 A1 | 10/2010 |
| DE | 102022107475 A1 | 10/2023 |
| EP | 2067227 B1 | 11/2010 |
| EP | 2595291 A1 | 5/2013 |
| JP | 2009261242 A | 11/2009 |

OTHER PUBLICATIONS

Klein-Hessling et al., Active DC-Power Filters for Switched Reluctance Drives based on Dual-Active Bridge Converters, May 2019, pp. 1694-1699, International Conference on Electric Machines and Drives (IEMDC).

Gautam et al., Control Strategies and Power Decoupling Topologies to Mitigate 2w-Ripple in Single-Phase Inverters: A Review and Open Challenges, Aug. 2020, pp. 147533-147559, Journals & Magazines >IEEE Access >vol. 8, https://ieeexplore.ieee.org/stamp/stamp.jsp?arnumber=9162645.

* cited by examiner

ABSORPTION CIRCUIT ARRANGEMENT FOR A TRACTION CONVERTER OF A RAIL VEHICLE

CROSS-REFERENCE TO RELATED APPLICATION

This application claims the priority, under 35 U.S.C. § 119, of German Patent Application DE 10 2023 206 584.3, filed Jul. 11, 2023; the prior application is herewith incorporated by reference in its entirety.

FIELD AND BACKGROUND OF THE INVENTION

The invention relates to an absorption circuit arrangement for a traction power converter of a rail vehicle, wherein the rail vehicle can be configured, in particular, as a multiple unit train for passenger transport or as a locomotive.

AC voltage supply networks for feeding rail vehicles with electrical energy, in particular in Europe, have a single phase AC voltage of 15 kV at 16.7 Hz or 25 kV at 50 Hz. A rail vehicle can be connected by means of one or more current collectors typically to overhead lines of the supply network. One or more primary windings of a traction transformer to which the single phase AC voltage of the supply network is applied are connected to the current collector. A lower single phase AC voltage which is dependent upon the selected transformation ratio is applied to one or more secondary windings of the traction transformer. A traction converter of the rail vehicle is connected to the one or the plurality of secondary windings. This comprises one or more supply-side power converters which are typically configured as four quadrant controllers (4QS) and thus as feedback-capable. This one or the plurality of supply-side power converters convert the single-phase AC voltage supplied by the traction transformer into a DC voltage for a DC link circuit of the traction converter. A link circuit capacitance consisting of one or more capacitors connected in parallel is arranged in the DC link circuit as an energy store. Also connected to the DC link circuit are one or more load-side power converters which are typically configured as pulse-controlled inverters (PWR). The load-side power converters convert the DC voltage provided by the DC link circuit into an AC voltage of variable amplitude and frequency with which one or more traction motors can be supplied. Further power converters for auxiliary operations of the rail vehicle and possibly one or more traction batteries can also be connected to the DC link circuit.

The electrical power provided by the supply-side power converter(s) has, apart from a constant portion, a portion that is overlaid pulsating with double the frequency of the supply network. In order to be able to provide, in particular, the load-side power converters with a constant power output which is largely free from these pulsating portions, in the DC link circuit of the traction converter and in parallel with the link circuit capacitance, typically a resonant circuit constructed from passive components is arranged as a so-called absorption circuit. This resonant circuit consists, for example, of a series circuit of a capacitance and/or a capacitor and an inductance and/or a choke with a low ohmic resistance. A resonance frequency of the absorption circuit is adjusted to twice the mains frequency, corresponding to 33.4 Hz for the aforementioned 15 kV, 16.7 Hz supply network and/or 100 Hz for the 25 kV, 50 Hz supply network, so that the portions at this frequency are almost completely removed via the absorption circuit. Higher-frequency portions such as, in particular, further harmonics of the mains frequency and switching frequencies of the power converter are additionally filtered by means of the link circuit capacitance. An absorption circuit constructed in this way with passive components has the disadvantage, in particular, that the components actually used are heavy, voluminous and also cost-intensive.

SUMMARY OF THE INVENTION

It is therefore an object of the invention to provide an absorption circuit arrangement for a traction converter of a rail vehicle, which overcomes the disadvantages mentioned. This object is achieved with the absorption circuit arrangement having the features of the independent absorption circuit arrangement claim and with the rail vehicle containing at least one such absorption circuit arrangement. Respective developments of the invention are disclosed in the dependent claims.

The absorption circuit arrangement according to the invention for a traction converter of a rail vehicle, the traction converter having at least one supply-side first power converter, at least one load-side second power converter, a DC link circuit connecting the at least one first power converter and the at least one second power converter with a first and a second voltage potential and at least one link circuit capacitance arranged in the DC link circuit is characterized in that the absorption circuit arrangement arranged in the DC link circuit and connected in parallel with the at least one link circuit capacitance contains at least one switching arrangement containing at least one switching unit and at least one inductance. Each switching unit contains two terminals, at least two controllable power semiconductor switches and at least one switching unit capacitance and is configured, dependent upon switching settings of the power semiconductor switches, to provide at least two different voltages at the terminals, and wherein the at least one inductance is connected in series with at least one switching unit, at least one capacitive energy store. The at least one capacitive energy store is connected in series with the at least one switching arrangement, and a control facility, wherein the control facility is configured to control at least the power semiconductor switches of the at least one switching unit.

Advantageously, the significantly smaller inductance of the switching arrangement enables the absorption circuit arrangement according to the invention to reduce losses which are caused in the known passive absorption circuit by the choke. Furthermore, the use of smaller and lighter electrical and electronic components enable an advantageous reduction of the weight and of the necessary volume as compared with the known passive absorption circuit. The absorption circuit arrangement also advantageously enables a simple matching of the absorption circuit arrangement to the mains frequency of the supply network, wherein further advantageously, the working frequency of the absorption circuit arrangement on a change of the mains frequency can be dynamically tracked by the control facility. Specifically in the case of a so-called multi-system rail vehicle which can be supplied, for example, with both the mains voltages and frequencies mentioned above, further advantageously, a switch-over facility required with a passive absorption circuit for adapting the resonance frequency is not needed.

According to a first development of the absorption circuit arrangement, a first terminal of each switching unit is alternatively connected to a second terminal of a further switching unit, to the first voltage potential of the DC link circuit, to the at least one inductance of the switching arrangement or to the capacitive energy store of the absorption circuit arrangement, and a second terminal of each switching unit is alternatively connected to a first terminal of a further switching unit, to the second voltage potential of the DC link circuit, to the at least one inductance of the switching arrangement or to the capacitive energy store of the absorption circuit arrangement.

According to a further development of the absorption circuit arrangement, the switching unit contains at least two power semiconductor switches connected as a half-bridge and the half-bridge and the at least one switching unit capacitance are connected in parallel and the first terminal of the switching unit is connected to an outer terminal of the half-bridge and the second terminal of the switching unit is connected to a central terminal of the half-bridge.

According to a further development alternative to the above further development of the absorption circuit arrangement, the switching unit contains at least four power semiconductor switches connected as a full-bridge, wherein at least two power semiconductor switches are connected as a respective half-bridge, and two half-bridges and the at least one switching unit capacitance are connected in parallel, and the first terminal of the switching unit is connected to a central terminal of one of the two half-bridges and the second terminal of the switching unit is connected to a central terminal of the other of the two half-bridges.

According to a further development of the absorption circuit arrangement, at least two switching arrangements are connected in parallel and the switching arrangements are connected in series with the at least one capacitive energy store.

According to a further development of the absorption circuit arrangement, the absorption circuit arrangement further contains at least one protective unit. The at least one protective unit is connected in parallel with the at least one switching arrangement, and wherein the at least one protective unit is configured to divert a surge current flowing through the absorption circuit arrangement past the at least one switching arrangement.

According to a further development of the absorption circuit arrangement, the absorption circuit arrangement further contains at least one switch, wherein each switch is associated with at least one switching arrangement and wherein each switch is configured to disconnect a current path through the associated switching arrangement, in particular a connection to the DC link circuit or the capacitive energy store.

The rail vehicle according to the invention contains at least one traction transformer facility which can be connected by means of at least one current collector to an AC voltage supply network, at least one traction converter which contains at least one supply-side first power converter, at least one load-side second power converter, a DC link circuit connecting the at least one first power converter and the at least one second power converter and at least one link circuit capacitance arranged in the DC link circuit, and at least one traction motor connected to the second power converter. The rail vehicle is characterized in that an absorption circuit arrangement according to the invention is arranged in the DC link circuit of the respective traction converter and in that the rail vehicle further contains a control facility which is configured to control at least the power semiconductor of the absorption circuit arrangement.

According to a development of the rail vehicle, it is configured as a multiple unit train, in particular for regional and long-distance traffic, or as a locomotive.

According to a further development of the rail vehicle, the at least one supply-side first power converter is configured as a self-regulated pulse-controlled converter, in particular as a four quadrant controller, and the at least one load-side second power converter is configured as a self-commutated pulse-controlled converter, in particular as a pulse-controlled inverter.

The absorption circuit arrangement according to the invention which, as distinct from the known passive absorption circuit, can also be designated an active absorption circuit, contains a series connection of one or more switching units, one or more inductances and one or more capacitive energy stores. Further corresponding series connections can be provided in parallel with this series connection, wherein they can use, for example, the one and/or more capacitive energy stores collectively. Furthermore, the absorption circuit arrangement can have a protective unit for diverting, for example, surge currents past components of the switching units and/or switches for disconnecting switching arrangements from the DC link circuit or the capacitive energy store, wherein by means of the switches, in particular, defective switching arrangements can be separated in order to continue the operation of the absorption circuit arrangement with the remaining switching arrangements.

If a current flows at the connecting points of the absorption circuit arrangement to the DC link circuit and if, at the same time, a voltage is applied to these connecting points, then the absorption circuit arrangement absorbs or emits electrical energy dependent upon the sign of the current and the voltage. An even energy balance is achieved in that the at least one capacitive energy store and/or the at least one switching unit capacitance and/or the at least one inductance absorb and emit an equivalent amount of energy, less the heat losses arising in the components.

By means of a suitable control of the power semiconductor switches of the switching unit and/or of the plurality of switching units by way of the control facility, in particular on the basis of measurement variables acquired by means of sensors, such as voltages on capacitances and/or currents in inductances, the current flow through the absorption circuit arrangement and therefore its energy uptake and energy output are influenced such that a desired compensation of pulsed energy and/or a power output in the DC link circuit originating, for example, from the single-phase supply network is adjusted.

A switching unit of the absorption circuit arrangement according to the invention contains, for example, a half-bridge with at least two power semiconductor switches, wherein the power semiconductor switches are each configured, for example, as a combination of an IGBT (insulated-gate bipolar transistor) and a diode connected antiparallel therewith, each produced from a silicon semiconductor material (Si) or as a MOSFET (Metal Oxide Semiconductor Field-Effect Transistor) with an intrinsically existing so-called body diode or, optionally, as a combination of a MOSFET and a Schottky diode connected antiparallel therewith, each produced from a silicon carbide (SIC) semiconductor material. Alternative semiconductor materials such as gallium nitride (GaN) or diamond which, like silicon carbide, have a larger band gap than silicon, can similarly be used for the production of the power semiconductor switches and possibly the diodes. Known power semiconductor switches have a reverse withstand voltage of, for example, 1.2 kV, 1.7 kV, 2.3 kV, 3.3 kV, 4.5 kV or 6.5 kV.

The switching unit capacitance of each switching unit can be configured, for example, as a capacitor, in particular as a film capacitor or an electrolytic capacitor. For an increase in the capacitance, in addition, further such capacitors, but alternatively or additionally also other energy stores, in particular double-layer capacitors or battery cells, can be connected to the switching unit capacitance in parallel. The switching unit capacitance is therein configured to have low inductance in order to enable a commutation of the power semiconductor switches of the switching unit. The reverse withstand voltage of the power semiconductor switches, in particular when they are connected into a half-bridge, is preferably selected to be higher than a maximum of the voltage on the switching unit capacitance associated with the half-bridge plus further voltage reserves for possible transient effects.

The power semiconductor switches of a switching unit, in particular if it contains a half-bridge, are driven by the control facility alternatingly into at least two combinations of switching settings so that at least two voltages prevail alternatingly on the terminals of the switching unit, for example, one voltage of zero volts and a current voltage on the switching unit capacitance. The switching of the power semiconductor switches therein preferably takes place at a switching frequency corresponding to a multiple of double the mains frequency, for example, in a range between 500 Hz and 5 KHz.

A current flow on the terminals of a switching unit multiplied by the voltage prevailing thereon results in a power flow into or out of the switching unit. This power flow less power losses, for example due to parasitic ohmic resistances results, observed over time, in an energy uptake or an energy output by the switching unit capacitance. Similarly to the capacitive energy store of the absorption circuit arrangement, a voltage change takes place dependent upon the state of charging of the switching unit capacitance with energy. A configuration of the absorption circuit arrangement takes place accordingly with the aim that at each desired operating point, taking account of voltages on the capacitive energy store, the at least one switching unit capacitance and the DC link circuit, at least one switching state of the at least one switching unit exists, at which a voltage with a positive or a negative sign can be set at each of the at least one inductance. This configuration enables a raising and lowering of the current flow in each switching unit and/or switching arrangement and thereby in the absorption circuit arrangement by way of suitable control of the power semiconductor switches.

The at least one capacitive energy store of the absorption circuit arrangement contains, for example, one or more capacitors, wherein these can be configured, according to the switching unit capacitance, in particular, as film or electrolytic capacitors. Additionally or alternatively, however, the capacitive energy store can in turn comprise double-layer capacitors or battery cells, the latter in particular on a lithium ion basis, in order to increase the capacitance.

During operation of the absorption circuit arrangement and/or of the traction converter, and in particular, in an embodiment of the at least one switching unit as a half-bridge, the voltage on the capacitive energy store varies in accordance with the description above. Preferably, the capacitive energy store is configured such that a maximum of the voltage reached with its complete charging with energy is in the region of a few tens of volts and/or between one and ten percent below the link circuit voltage and/or the voltage on the link circuit capacitance.

The capacitance of the capacitive energy store is preferably selected such that a difference between the voltage applied thereto and the link circuit voltage is so small that at any time point for each switching unit, a switching state exists in which on each inductance of the associated switching arrangement, a positive or a negative voltage can be set. Therein, a critical time point is, for example, the reaching of a minimum of the voltage on the capacitive energy store, in particular, with a minimum charging with energy, since the switching units must then be able to generate a highest least voltage value.

A voltage is applied to the at least one inductance of a respective switching arrangement of the absorption circuit arrangement, from which there results a change in the current flow in the inductance and thus in the absorption circuit arrangement. The voltage on the inductance therein depends upon the switching state of the switching unit, the voltage on its switching unit capacitance and on the voltage on the capacitive energy store.

In comparison with the inductance and/or choke of a passive absorption circuit, the inductance of the switching arrangement can advantageously be selected to be substantially, for example by a factor of five to twenty-five times, smaller. In contrast to the passive absorption circuit, during operation of the absorption circuit arrangement, there results a current through the inductance that varies with a particular harmonic about a desired fundamental oscillation. The desired fundamental oscillation is therein a target value for the current through the absorption circuit arrangement, typically a sinusoidal current with double the mains frequency, which compensates for the pulsating power output. An effective value of the fundamental oscillation of the current through the inductance is therein advantageously not greater than the effective value of the current through the inductance of a passive absorption circuit.

A rate of rise of the current therein defines the amplitude of the harmonic at a particular switching frequency for the power semiconductor switches of the switching units. For the achievement of a low switching frequency, with the advantage of lower switching losses in the power semiconductor switches, and/or a low inductance, with the advantage of lower costs, a smaller required structural space and a lower mass, and/or lower harmonics, with the advantage of lower loss in the inductance, the height of the voltage on the inductance should preferably be reduced at each operating point. This can take place, for example, by way of a switching of a plurality of switching units in series, so that a finer gradation of the voltage applied to the inductance is achieved. Furthermore, the absorption circuit arrangement can be configured, for example, such that the voltage on the switching unit capacitance is as low as possible, but that the voltage on the capacitive energy store has only a slight difference from the link circuit voltage.

The inductance of a switching arrangement consists, for example, of a ferromagnetic core which has one or more recesses and its contour has one or more discrete and/or distributed air gaps. The recesses are therein wound with one or more windings of electrically conductive wires, films or cords which are connected in series or in parallel. Provided the absorption circuit arrangement contains a plurality of switching arrangements and thus a plurality of inductances, they can, for example, share a common core with a plurality of windings.

For example, in the event of a short-circuit in the DC link circuit, in a power converter of the traction converter, or in another component connected to the DC link circuit as a fault case, large surge currents arise which can flow through the absorption circuit arrangement arranged in the DC link circuit. Diodes of the power semiconductor switches of the switching units specifically connected antiparallel can, if they are configured with regard to their surge current resistance for a normal operation and are not able to be switched and/or separated in a timely manner can be destroyed, with the result that the operation of the absorption circuit arrangement and thus of the traction converter is impaired. Preferably, the absorption circuit arrangement therefore comprises at least one protective unit by means of which surge currents are diverted, in particular, past the switching units and/or their power semiconductor switches and diodes.

A protective unit preferably contains one or more diodes and one or more ohmic resistors connected in series therewith. Preferably, the protective unit is arranged in the absorption circuit arrangement such that a voltage on the protecting unit changes only slowly during normal operation of the absorption circuit arrangement, for example at a multiple of, in particular, double or four times, the mains frequency. If the at least one switching unit contains, for example, a half-bridge, the slow change can be achieved, for example, in that the protective unit terminals are not connected to the central terminal of the respective half-bridge. This advantageously enables the use of economical mains rectifier diodes having a high level of surge current resistance. A preferred arrangement of this type of the protective unit exists if it is connected in parallel with the switching arrangement and/or with the plurality of parallel-connected switching arrangements. Therein, in normal operation of the absorption circuit arrangement, the at least one diode of the protective unit is oriented in the reverse direction and, in the event of a fault, it is oriented, in accordance with the diodes that are to be protected of the power semiconductor switches of the switching arrangements, in the forward direction.

The at least one resistance of the protective unit has a lower effective resistance value as compared with the switching arrangement. This resistance value is preferably dimensioned so that the portion of the surge current flowing through the switching arrangement remains below a value permissible for the diodes thereof that are to be protected, whereas the other larger portion of the surge current flows away via the more highly loadable protective unit. Apart from a conversion of a part of the energy of the surge current into heat, the at least one resistance of the protective unit also delimits its amplitude, so that an economical configuration of the at least one diode of the protective unit is in turn advantageously enabled.

The control facility of the absorption circuit arrangement can be associated, for example, exclusively with the absorption circuit arrangement and/or the power semiconductor switches and switches that are possibly provided. Preferably, however, the control facility is a component and/or a special function of a central control facility of the traction converter which also controls, in particular, power semiconductor switches of the first and second power converters and possibly further components. For example, the function of the control facility is configured as part of a drive control system of the rail vehicle.

The method according to the invention for controlling an absorption circuit arrangement according to the invention is characterized in that the power semiconductor switches of the at least one switching unit is controlled by the control facility such that, from a current flow generated by means of the absorption circuit arrangement, a compensation of at least one harmonic of a mains frequency impressed upon the DC link circuit is brought about.

According to a development of the method according to the invention, the power semiconductor switches are controlled by the control facility such that state variables, in particular voltages on the at least one switching unit capacitance and currents through the at least one inductance of the at least one switching arrangement and voltages on the at least one capacitive energy store of the absorption circuit arrangement are tracked according to specified target values.

According to a further development on the basis of the aforementioned development of the method according to the invention, provided a link circuit voltage determined by the control facility lies within specified threshold values and/or a target current through the at least one inductance lies within specified threshold values, the control of the power semiconductor switches by the control facility is discontinued.

The link circuit voltage can therein be determined by way of suitable measurement by the control facility. A target current and/or a current to be set by the absorption circuit arrangement is preferably within specified threshold values about a zero point. The discontinuation of the control of the power semiconductor switches of the at least one switching unit preferably has the consequence that they are placed in a blocking state.

According to a further development of the method according to the invention, with at least two switching arrangements connected in parallel, the power semiconductor switches are driven by the control facility in such a way, in particular phase-offset, that harmonics of currents in the switching arrangements at least partially cancel each other out.

An essential aim of the control of the absorption circuit arrangement by the control facility is the setting of a current by the absorption circuit arrangement by means of which exactly or approximately exactly an overlaid portion caused, in particular, by the mains frequency is compensated for, so that as a result, the link circuit voltage can be kept constant. In addition, by way of a suitable control, apart from these portions, further higher-frequency portions such as, in particular, further harmonics of the mains frequency and/or the switching frequencies of the power converter are compensated for.

By means of the control system, in particular state variables within the absorption circuit arrangement are influenced. This influencing can relate, for example, to the voltages on the capacitive energy store and the switching unit capacitances and/or the currents through the inductance and/or plurality of inductances. Therein, these voltages and/or currents can be tracked, for example and in particular, independently of each other, in each case to a predefined target value. Deviations from the predetermined target values occur, for example, on the basis of a discharge of capacitances by way of leakage currents or energy losses in power semiconductor elements and inductances.

Suitable target values for the state variables exist, for example, when a constant and/or almost constant link circuit voltage is achieved therewith given a permissible deviation of, for example, a few percentage points. In addition, the target values are selected, for example, such that a maximum value of the voltage is present on the at least one capacitive energy store of only a few tens of volts and/or one to ten percentage points below the link circuit voltage. On the basis thereof, the target values are further selected, for example, such that a voltage on the at least one switching unit capacitance, at the specified target values for the capacitive energy store, is selected to be still sufficiently high enough and/or with an exemplary reserve of a few tens of volts and/or one to ten percentage points of the link circuit voltage, such that at least one switching state of the switching units always exists at which a voltage of positive or negative sign can be set on the at least one inductance of the associated switching arrangement.

By way of these additionally selected target values for the voltages on the capacitive energy stores and the switching unit capacitance, it can be ensured that, firstly, the current flow through the absorption circuit arrangement is able to be influenced by means of the control facility and, secondly, a voltage applied to the at least one inductance is able to be kept as low as possible. Advantageously, a low voltage on the inductance therein leads to a small change in the current per time unit, so that smaller harmonics can be achieved in the current by way of the inductance, and correspondingly in the DC link circuit.

By means, in particular, of a selection, which changes over time, of switching states of the power semiconductor switches of switching units of the at least one switching arrangement by way of the control facility, a resulting voltage on the at least one inductance of the switching arrangement can be set, so that in turn a change of the current can be brought about by way of the inductance and/or by way of the absorption circuit arrangement.

If the absorption circuit arrangement contains, for example, a plurality of circuit arrangements connected in parallel, each with at least one switching unit and at least one inductance, by way of the selection of the switching states, the current in each switching arrangement can be influenced in that harmonics of the currents in the total current resulting from the plurality of currents at least partially cancel each other out. For this purpose, the control of the power semiconductor switches of the switching units of each switching arrangement can be, for example, temporally offset and/or phase-shifted such that with a current rising at a particular rate in the inductance of the one switching arrangement, the total current of the further switching arrangements falls at an identical or at least similar rate, and/or that with a current falling at a particular rate in the inductance of the one switching arrangement, the total current of the further switching arrangements rises at an identical, or at least similar, rate.

Provided a plurality of possible switching states exist which each apply a voltage of the same sign to the at least one inductance of one switching arrangement and cause a current change of the same sign in the inductance, the suitable switching state can be selected on the basis, in particular, of the following criteria. As a first criterion, given a plurality of switching states which each influence a voltage on the switching unit capacitances of the switching units such that they are charged up, the switching state can be selected which leads to the charging up of one or more switching unit capacitances, the voltage of which is as far below a specified target value as possible. Accordingly, given a plurality of switching states which each influence the voltage on the switching unit capacitances such that they are discharged, the switching state is selected which leads to the discharging of one or more switching unit capacitances, the voltage of which is as far above the specified target value as possible. As a second criterion, the switching state which leads to an application of a quantitatively low voltage on the at least one inductance can be selected in order to achieve a low rate of change of the current and thereby low harmonics when with this low voltage the desired target current can be achieved within a particular time period, for example within one to three switching periods and otherwise a switching state is selected which leads to a quantitatively higher voltage being applied. Furthermore, as a third criterion, in particular if the first and second criterion cannot be fulfilled simultaneously, the first criterion can be preferred if the voltage on the switching unit capacitances deviates by more specified percentage points, for example by twenty percentage points, from the specified target value.

If the current set by the absorption circuit arrangement corresponds to exactly the current to be compensated less possible harmonics, for example, due to the switching of power semiconductor switches of the power converter, then this can be regarded as an ideal compensation current. A limited deviation from this ideal compensation current and, subsequently thereto, a limited deviation from an ideal constant link circuit voltage, for example by a few tens of volts and/or a few percentage points, can however provide advantages for the control of the absorption circuit arrangement without having negative consequences for the traction converter and/or the traction system.

In particular, in time periods in which only a low compensation current is required, for example, the control of the switching states of the power semiconductor switches by the control facility can be discontinued. This discontinuation brings about a blocking of the power semiconductor switches, so that no further current flows through the respective switching arrangement. Preferably the control is discontinued for as long as the link circuit voltage lies within a specified tolerance band delimited by an upper and a lower threshold value. For example, the discontinuation takes place if a change in the sign of the compensation current occurs due to harmonics autonomously created by the absorption circuit arrangement itself, while the target value of the fundamental oscillation of the current by way of the absorption circuit arrangement in an identical observed time period has a constant sign. Only in the event of an expected overshooting or undershooting of the specified tolerance band is the control of the power semiconductor switches activated for as long again and a compensation current is set by the absorption circuit arrangement until the link circuit voltage has reached a value starting from which it will remain within the tolerance band for as long a time period as possible. After reaching this value, the control of the power semiconductor switches by the control facility is in turn discontinued. By this means, the current flow through the absorption circuit arrangement is temporally restricted so that advantageously losses can be reduced and the efficiency of the absorption circuit arrangement can be increased.

Alternatively or in addition to time periods in which the control of the power semiconductor switches is discontinued, a deviation from an ideal compensation current can take place in order to track voltages on storage unit capacitances and on the at least one capacitive energy store. With at least two switching arrangements connected in parallel with at least one switching unit and with an inductance connected in series therewith, for example, in addition to the compensation current, further current portions can be fed in. These further current portions preferably have a significantly lower frequency as compared with the fundamental oscillation and/or a DC portion which changes only slowly. If such a DC portion flows through a first one of the switching arrangements, then this leads, dependent upon the sign of the current portion, to a charging and/or discharging of at least one storage unit capacitance of a switching unit of the first switching arrangement. If the circuit for this DC portion closes in that this current flows back again through a second of the switching arrangements, then this leads accordingly to a discharging and/or charging of at least one switching unit capacitance of a switching unit of the second switching arrangement. By this means, the voltages on the switching unit capacitances of parallel-connected switching arrangements are influenced in dependence upon one another.

If, however, the circuit for this DC portion closes while the current portion flows through the first switching arrangement and via the at least one capacitive energy store of the absorption circuit arrangement, then dependent upon its sign, this leads to a simultaneous charging and/or discharging of both the capacitive energy store and also at least one switching unit capacitance of a switching unit of the first switching arrangement. This closing of the circuit also takes place in the event that, in place of the above exemplary two parallel-connected switching arrangements, the absorption circuit arrangement comprises only a single switching arrangement.

Further, alternatively or additionally, the current flow through the absorption circuit arrangement can be controlled in such a manner that, at an assumed or specified target value for the link circuit voltage, during a phase of energy uptake by the absorption circuit arrangement the link circuit voltage can be below this value, whereas during a phase of energy output by the absorption circuit, the link circuit voltage can be above the target value. The phases of energy uptake and energy output therein occur in accordance with the fundamental oscillation. As compared with an ideal compensation current at which the link circuit voltage constantly corresponds to the target value for the link circuit voltage, this leads on average to a reduction of the stored energy in at least one of the switching unit capacitances and thus to a reduction of the voltage applied on average to this switching unit capacitance. Conversely, a control of the current flow through the absorption circuit arrangement such that during a phase of energy output, the link circuit voltage is below the target value for the link circuit voltage and during a phase of energy uptake it is above the target value can lead, on average, to an increase in the stored energy in at least one of the switching unit capacitances and thus to an increase in the voltage applied on average to this switching unit capacitance. This behavior can advantageously be used to change the respective voltage on the at least one switching unit capacitance. For example, this can take place via an application of an additional alternating current portion which is phase-shifted by plus or minus 90 degrees compared with the current portion exchanged with the DC link circuit. This additionally applied alternating current portion causes a ripple in the link circuit voltage which is matched to the phase of the energy uptake and/or the energy output, so that a reduction and/or increase in the energy stored in the at least one switching unit capacitance and thus to a fall in the voltage applied to the switching unit capacitance takes place.

By means of a combination of the instances of control of the absorption circuit arrangement described above by way of the control facility, the voltages on the at least one switching unit capacitance and on the at least one capacitive energy store can be influenced independently of one another and can thus be tracked to a desired and/or preset target value.

A change in the mean voltage on the at least one capacitive energy store of the absorption circuit arrangement without influencing the voltage on the at least one switching unit capacitance can therein take place, for example, by applying an additional DC portion to the current by way of the capacitive energy store, so that in the case of a plurality of switching arrangements connected in parallel, the additional DC portion is applied jointly and preferably equally distributed. The additional DC portion leads to an increase and/or decrease in the mean voltage on the capacitive energy store. In order therein to prevent a corresponding increase and/or decrease in the mean voltage on the switching unit capacitances, an application of a ripple to the link circuit voltage takes place simultaneously so that the energy uptake and/or energy output of the switching unit capacitances is compensated for by the DC portion.

In order to be able to keep the mean voltage on the switching unit capacitances constant, a balancing out must possibly take place between different voltages on the switching unit capacitances which are the result, for example, of production tolerances in the switching unit capacitances. Therein, for a change in the mean voltage on all the switching unit capacitances and without changing the mean voltage on the at least one capacitive energy store, a ripple can be applied to the link circuit voltage, which leads to a desired energy uptake and/or energy output by the switching unit capacitances. Additionally, with at least two switching arrangements connected in parallel, each with at least one switching unit capacitance for a balancing out of the voltages on the switching unit capacitances, a DC portion of a current is applied between these parallel switching arrangements, which flows via a first and a second switching arrangement and thereby influences the mean voltage in the first switching arrangement in the reverse direction to the mean voltage in the second switching arrangement. Furthermore, in a switching arrangement with a plurality of switching units connected in series for a balancing out of different voltages on the switching unit capacitances of these switching units, additionally dependent upon a direction of the current flow, a switching state of the switching units can be selected which increases an excessively low voltage on each of the switching unit capacitances or at least does not reduce it further, and/or reduces an excessively high voltage or at least does not increase it further. In a corresponding embodiment of the absorption circuit arrangement, the methods described can preferably be carried out simultaneously and/or in parallel.

The control of the absorption circuit arrangement takes place, as far as the control facility is concerned, taking account of values determined by means of suitable sensors with respect, in particular, to currents flowing in the absorption circuit arrangement and voltages applied to capacitances. These values are determined at, for example, ten times to a thousand times the mains frequency. On the basis of the values, the control facility determines an actual state of the absorption circuit arrangement, starting from which it derives required measures for an approximation to a desired target state of the absorption circuit arrangement by way of a suitable control of the power semiconductor switches.

The voltages on the at least one capacitive energy store and on the at least one switching unit capacitance can be tracked with only limited dynamics with target values determined or specified by the control facility according to the methods described above. If, during normal operation of the absorption circuit arrangement, due, for example, to an abrupt load change in the traction system, a likewise abrupt change in the target values should occur, then an approximation to these target values by means of the control method described above for the power semiconductor switches may possibly no longer be possible due to the limited dynamics, so that the absorption circuit arrangement assumes an operating state in which, at least over a part of the period of the fundamental oscillation, no switching states of the power semiconductors exist in order to be able to set a voltage of both signs on each inductance of the absorption circuit arrangement. This has the consequence that the current through the corresponding inductance can no longer be controlled as desired. Such a situation can be designated an infringement of the actively controllable operating region.

In order to recognize whether, proceeding from the determined actual state of the absorption circuit arrangement, the required compensation current and taking account of the properties of the absorption circuit arrangement during the subsequent period, such an infringement of the actively controllable operating region must be expected and in order then to be able to derive corresponding measures, starting from these parameters, the control facility should preferably make a regular prediction regarding a future behavior, for example over a time period corresponding to half a period of the mains frequency. A temporal sequence of the behavior of state variables predicted in this way, for example, voltages on capacitive energy stores and switching unit capacitances, is subsequently checked with regard to possible infringements of the actively controllable operating region. For example, an infringement is caused by a lack of an intended switching state of a switching arrangement that is intended to serve to increase or reduce the current in the associated inductance. Preferably, the prediction can therein be restricted to particularly critical time periods within the periods under observation, for example, time points of maximum and/or minimum stored energy in the absorption circuit arrangement. If in relation to the maximum and/or minimum voltages associated therewith on the at least one switching unit capacitor and on the capacitive energy store, no infringement of the actively controllable operating region can be established, it is also not to be expected for other time points.

In order to counter an infringement of the actively controllable operating region, if one such has occurred or is predicted by the control facility, according to a first method, for example, during a phase in which the absorption circuit arrangement is to take up or output energy, the power semiconductor switches of the at least one switching unit can be held at the start of this phase over a specified time period in a switching state which corresponds to a blocking and only subsequently can be placed in switching states in which they set the compensation current until the completion of the phase. Preferably therein, the time period of the blocking is dimensioned such that during the subsequent time period until the completion of the phase of the energy uptake or the energy output, no infringement of the actively controllable operating region is predicted and/or occurs. In combination with the power converters of the traction converter, the control according to this first method leads to a variable link circuit voltage which changes the actual state of the absorption circuit arrangement over time such that it can transition in turn into a normal operation without infringing the active controllable operating region.

Furthermore, in order to counter an infringement of the actively controllable operating region, if it has occurred or is predicted by the control facility, according to a second method, alternatively, during a phase in which the absorption circuit arrangement is to take up or output energy, the power semiconductor switches of the at least one switching unit can be placed at the start of this phase into switching states in which they set the compensation current until the compensation current is no longer able to be set due to an infringement of the actively controllable operating region. After this time period, until the completion of the phase, the power semiconductor switches are placed in a switching state which corresponds to a blocking or a continuous conduction. In combination with the power converters of the traction converter, the control according to this second method itself leads to a variable link circuit voltage which changes the actual state over time such that the absorption circuit arrangement can transition again into a normal operation without infringing the actively controllable operating region.

For the selection of one of the two methods described above for a transition into a normal operation of the absorption circuit arrangement from a state of actual or predicted infringement of the actively controllable operating region, starting from the actual state of the absorption circuit arrangement, a scenario can be calculated by the control facility in which the capacitive energy store and the switching unit capacitances of the absorption circuit arrangement can be charged and/or discharged with a pure DC current, wherein the DC current is evenly distributed over the parallel-connected switching arrangements until a first infringement of the actively controllable operating region occurs. If this infringement consists, for example, of an excessively high voltage on the at least one capacitive energy store, in particular a higher voltage than the link circuit voltage, preferably the first method is carried out while, for other infringements, the second method is preferably carried out.

According to the invention, an absorption circuit arrangement according to the invention is used in a traction converter of a rail vehicle or for a method according to the invention.

Other features which are considered as characteristic for the invention are set forth in the appended claims.

Although the invention is illustrated and described herein as embodied in an absorption circuit arrangement for a traction converter of a rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

For the sake of clarity, the same reference characters are used for identical and/or for identically or approximately identically acting components.

DETAILED DESCRIPTION OF THE INVENTION

Figure 1:
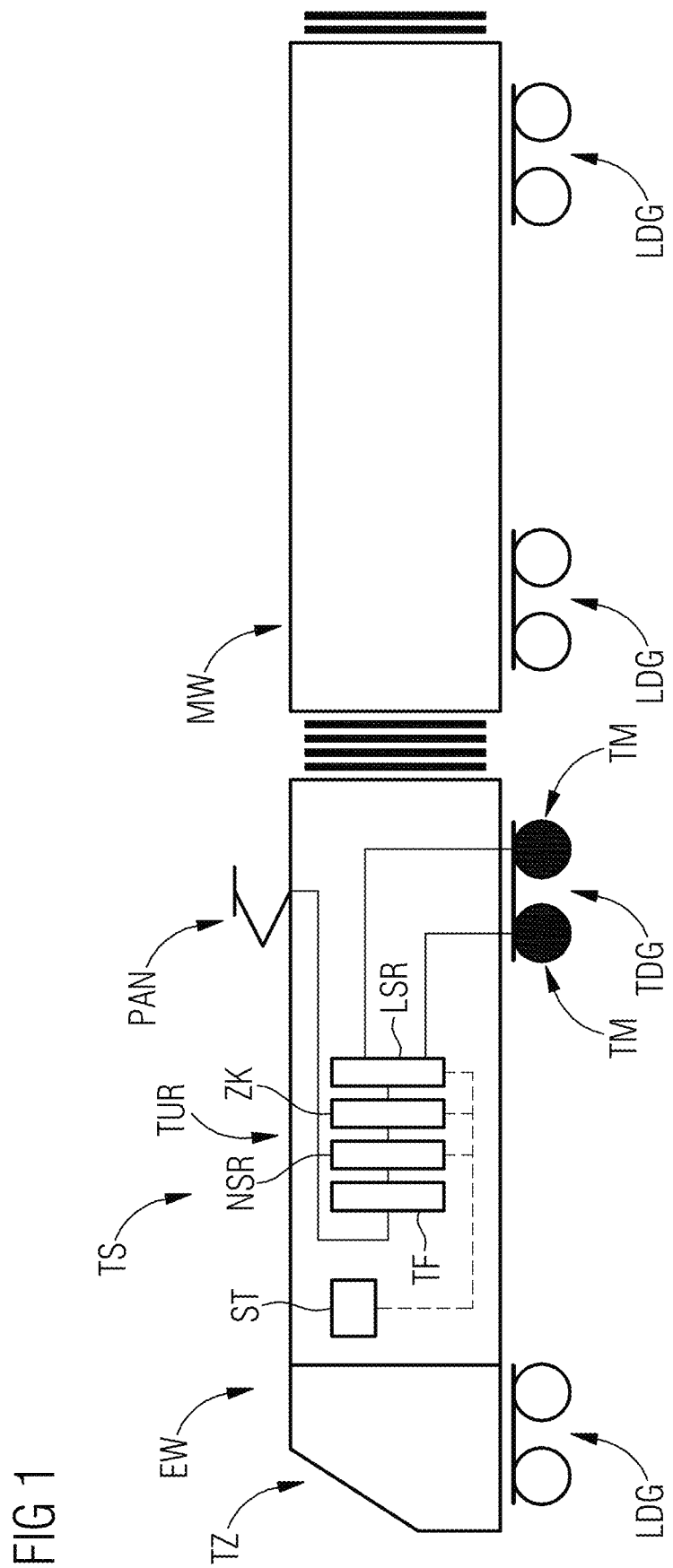
FIG. 1 is an illustration of a rail vehicle with a traction system for operation with an AC voltage supply network.

Referring now to the figures of the drawings in detail and first, particularly to FIG. 1 thereof, there is shown a rail vehicle TZ in a side view. The rail vehicle TZ is configured, for example, as a multiple unit train with a plurality of cars, wherein only an end car EW and a middle car MW coupled thereto are shown. Each car has a car body which is supported via bogies in the form of motor bogies TDG with traction motors TM arranged therein and unpowered bogies LDG on rails of a track (not shown). Alternatively to a multiple unit train with a plurality of cars, the rail vehicle can also be configured as a locomotive with just one car body.

A traction system TS of the rail vehicle TZ contains, apart from traction motors TM in one or a plurality of motor bogies TDG, a traction converter TUR, a control facility ST controlling at least the traction converter TUR, a transformer TF and a current collector PAN. These components of the traction system TS are shown schematically arranged in and/or on the end car EW. In practice, however, in particular when the end cars are also used for carrying passengers, the components are typically arranged in special regions within the car body, in the underfloor region, in the roof region or distributed over a plurality of cars of the rail vehicle TZ. By this means, a passenger space can be provided in each car body, wherein the passenger spaces of neighboring cars can be connected to one another as shown, via intercar gangways. Further components of the traction system TS, for example, one of more traction batteries and auxiliary systems serving for the operation of the components and the comfort of the passengers can additionally be provided and arranged accordingly. Such components are, however, not specifically shown in FIG. 1.

By way of the current collector PAN arranged, by way of example, in the roof region of the car body of the end car EW, the traction system TS is able to be electrically connected to an overhead conductor (not shown) of a supply network. By way of example, a single-phase AC voltage typical for Europe of 15 kV at 16.7 Hz or 25 kV at 50 Hz is applied to the overhead conductor. This AC voltage is fed to a primary winding of the transformer TF which transforms the supply-side voltage level according to a selected transformation ratio of the transformer TF to a lower voltage level. One or more secondary windings of the transformer TF are connected to one or more supply-side first power converters NSR, each configured, for example, as a four quadrant controller, of the traction converter TUR. The first power converters NSR convert the single-phase AC voltage of the transformer TF into a DC voltage which is fed to a common DC link circuit ZK. Furthermore, one or more load-side second power converters LSR of the traction converter TUR are connected to the DC link circuit ZK, and are each configured, for example, as a pulse-controlled inverter. The second power converters LSR convert the DC voltage of the DC link circuit ZK, for example, into a three-phase AC voltage of variable frequency and amplitude with which stator windings of one or more traction motors are each fed. What is controlled is the respective function of the power converters NSR, LSR of the central control facility ST of the traction system TS and/or of the traction converter TUR.

Figure 2:
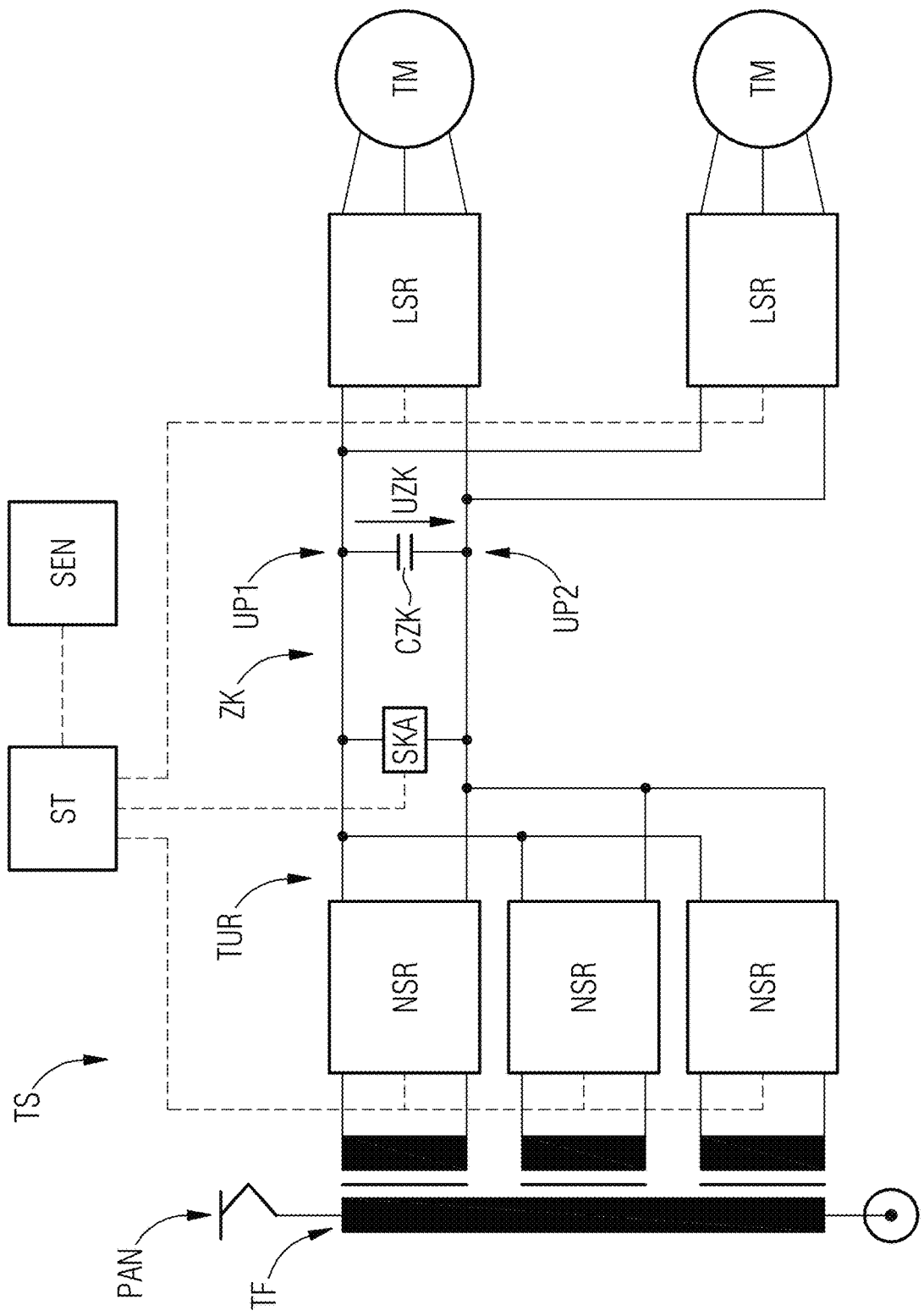
FIG. 2 is a block diagram showing the traction system with an absorption circuit arrangement according to the invention.

FIG. 2 shows the traction system TS of FIG. 1 in a more detailed schematic representation. The primary winding of the transformer TF is accordingly connected on one side to the current collector PAN and on the other side, for example, via a wheelset to rails. The three secondary windings, shown by way of example, of the transformer TF are each connected to a supply-side first power converter NSR of the traction converter TUR which convert the AC voltage provided by the secondary winding into a DC voltage with which they supply a common DC link circuit ZK. Two load-side second power converters LSR that, by way of example, are provided are fed by the DC link circuit, the power converters each converting the DC voltage provided by the DC link circuit ZK into a three-phase AC voltage of variable amplitude and frequency, with each of which, by way of example, a traction motor TM in the motor bogie TDG of the end car EW of the rail vehicle TZ is fed. In particular, in an embodiment of the traction motors TM as three-phase synchronous machines, each second power converter LSR feeds just one traction motor TM, whereas in embodiments of the traction motors TM as three-phase asynchronous machines, every second power converter LSR can also feed a plurality of traction motors TM, of, for example, a motor bogie in parallel. The function of each of the first and second power converters NSR, LSR and/or in particular the switching settings of their respective power semiconductor switches is controlled by the central control facility ST of the traction converter TUR and/or of the traction system TS by means of control signals generated by the control facility ST. The control facility ST bases the control on, for example, information from various sensors SEN, in particular voltage and current sensors. Signal-carrying connections between the control facility ST and the power converters NSR, LSR and the sensors SEN are each represented in FIGS. 1 and 2 with dashed lines.

A link circuit capacitance CZK is arranged in the DC link circuit ZK of the traction converter TUR. This link circuit capacitance CZK represented, by way of example, as a single capacitance can comprise one or more parallel-connected capacitors, wherein these can also be arranged distributed, for example, each as a component of the second power converters LSR. A link circuit voltage UZK exists on the link circuit capacitance CZK and/or between a first voltage potential UP1 and a second voltage potential UP2 of the DC link circuit ZK during the normal operation of the traction converter TUR.

Arranged in the DC link circuit ZK and in parallel with the link circuit capacitance CZK is also an absorption circuit arrangement SKA according to the invention which is also connected to the control facility ST for signaling purposes, as in turn shown by means of a dashed line.

Figure 3A:
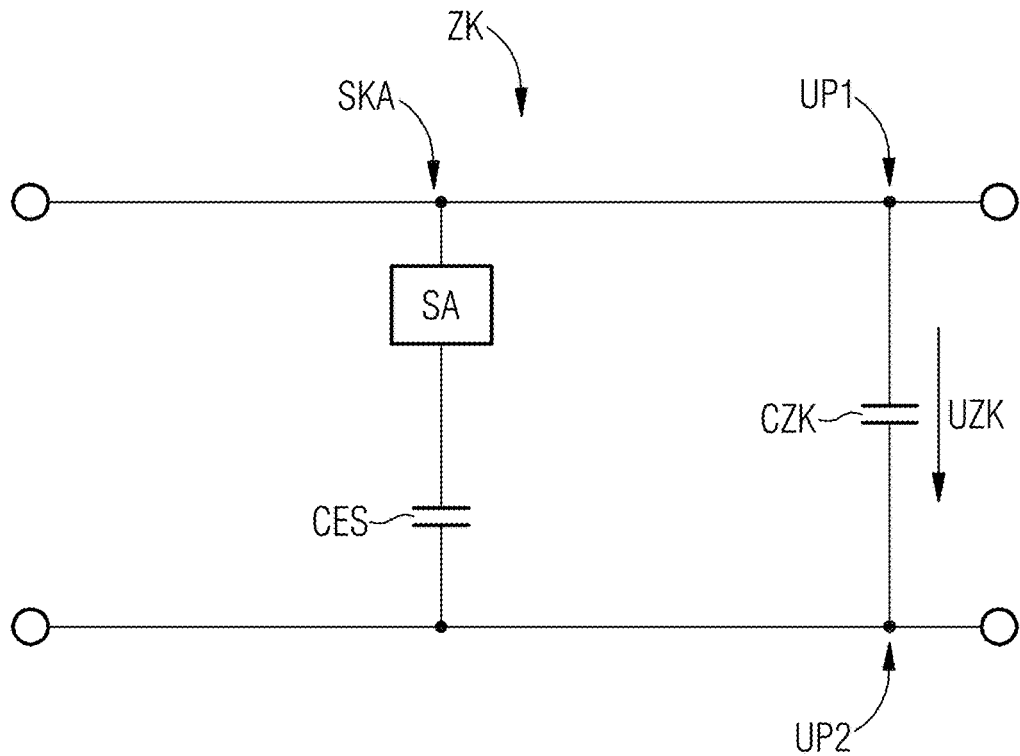
FIGS. 3A-3C are schematic diagrams showing alternative embodiments of the absorption circuit arrangement according to the invention.

FIG. 3 shows exemplary alternative embodiments of the absorption circuit arrangement SKA according to the invention which is arranged according to FIG. 2 in the DC link circuit ZK and in parallel with a link circuit capacitance CZK. The absorption circuit arrangement SKA of FIG. 3A therein contains a switching arrangement SA and a capacitive energy store CES connected in series therewith. The switching arrangement SA is therein connected to the first voltage potential UP1 of the DC link circuit ZK, whereas the capacitive energy store CES is connected to the second voltage potential UP2 of the DC link circuit ZK. The arrangement of the two components SA, CES of the absorption circuit arrangement SKA and their connection to the voltage potentials UP1, UP2 of the DC link circuit ZK is therein selected by way of example.

Figure 3B:
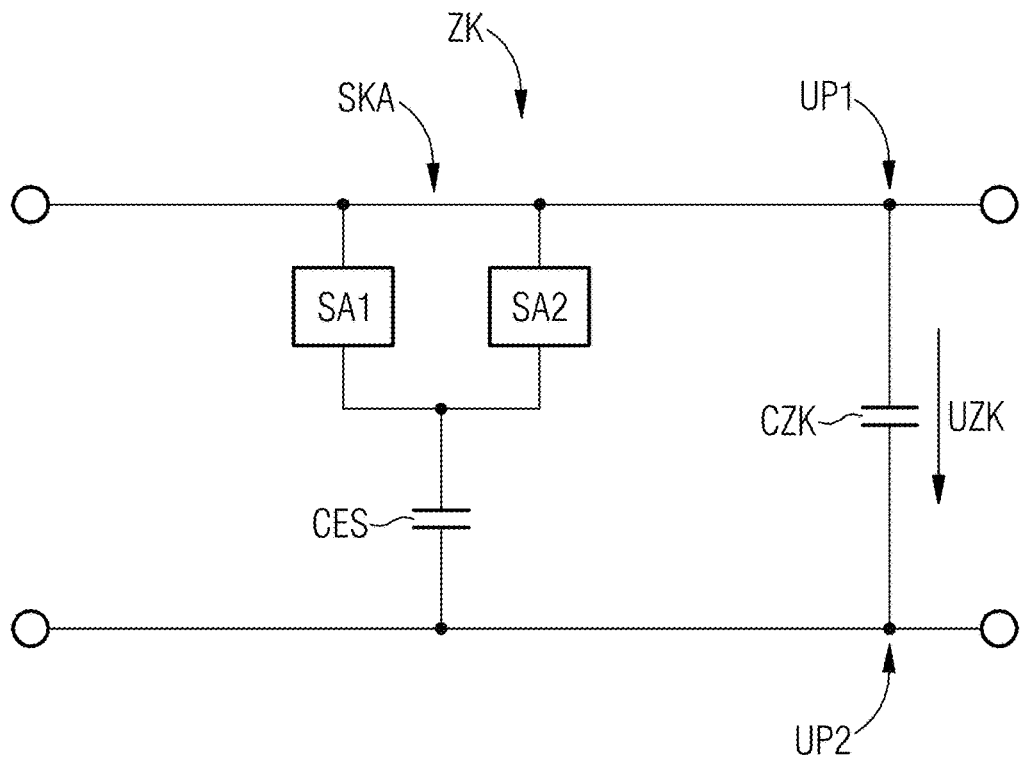
Figure 3C:
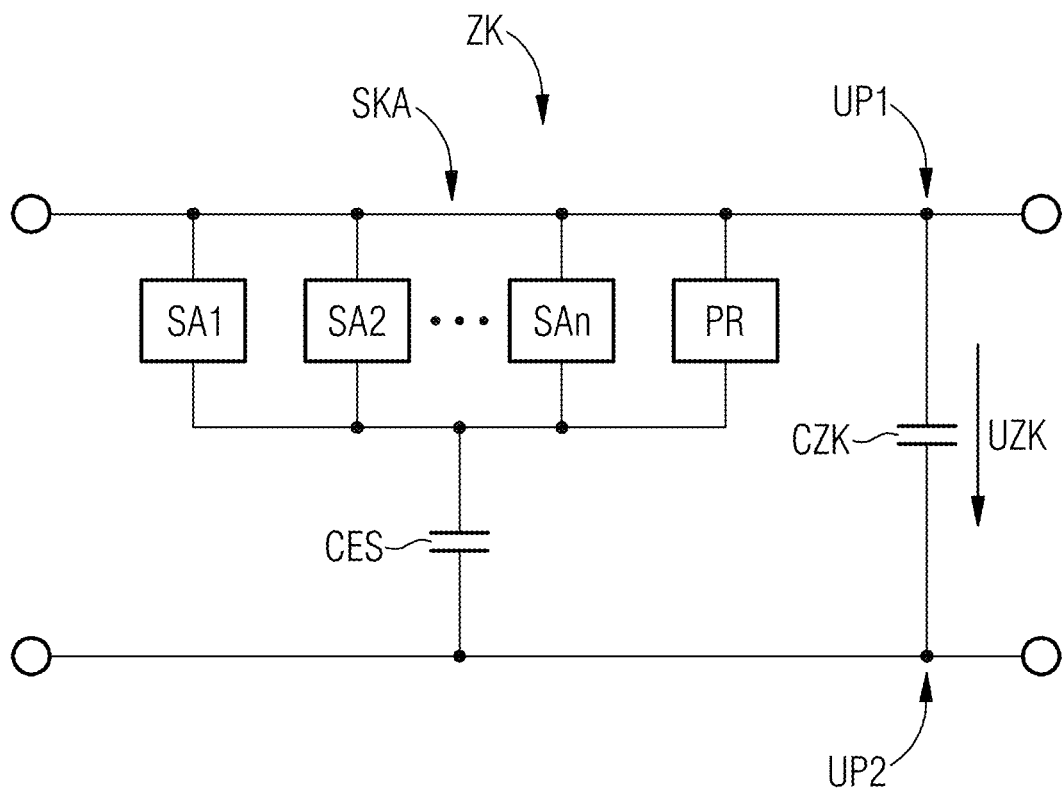

The alternative absorption circuit arrangement SKA of FIG. 3B, by contrast, contains two switching arrangements SA1, SA2 connected in parallel and in turn a common capacitive energy store CES connected in series therewith. The further alternative absorption circuit arrangement SKA of FIG. 3C comprises a plurality of switching arrangements SA1 to SAn connected in parallel and in turn a common capacitive energy store CES connected in series therewith. A parallel connection of a plurality of switching arrangements SA according to FIGS. 3B and 3C enables a scaling of the efficiency of the absorption circuit arrangement SKA, wherein the switching arrangements SA and/or their switching units SE can be controlled, for example, temporally offset and/or phase-shifted by the control facility ST. In addition, the absorption circuit arrangement SKA of FIG. 3C further comprises a protective unit PR which is connected in parallel with the switching arrangements SA1 to SAn. The absorption circuit arrangements SKA of FIGS. 3A and 3B preferably also comprise a protective unit PR of this type.

FIG. 4 shows exemplary alternative embodiments of a switching arrangement SA of the absorption circuit arrangement SKA according to the invention. The alternative switching arrangements SA of FIGS. 4A and 4B each comprise one switching unit SE with a first terminal AS1, a second terminal AS2 and an inductance DR connected in series with the switching unit SE. As FIGS. 4A and 4B make clear, on the basis of the series connection, the inductance DR can alternatively be connected to the first terminal AS1 according to FIG. 4A or to the second terminal AS2, according to FIG. 4B, of the switching unit SE.

Figure 4A:
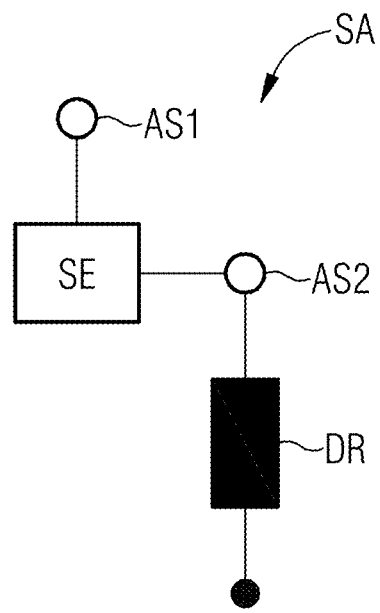
FIGS. 4A-4E are block diagrams showing alternative embodiments of switching arrangements of the absorption circuit arrangement according to the invention.
Figure 4B:
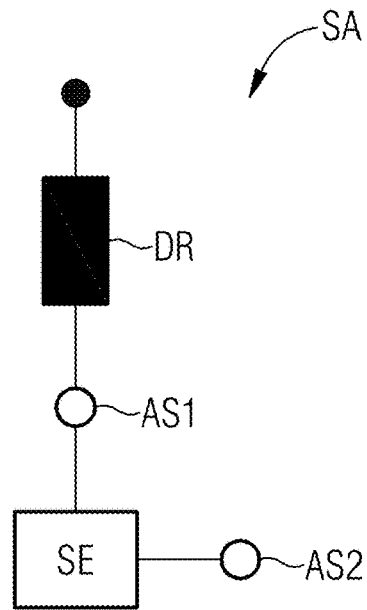
Figure 4C:
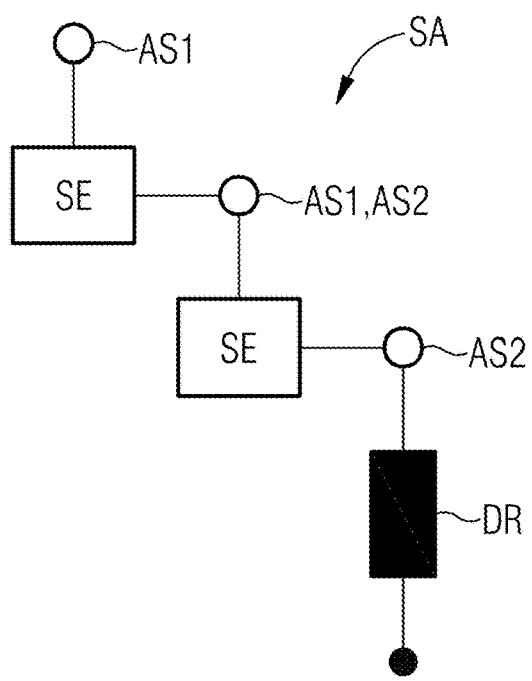
Figure 4D:
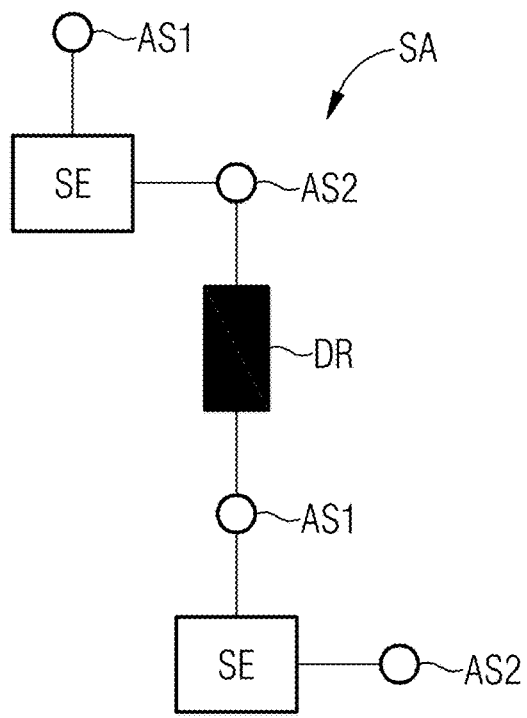
Figure 4E:
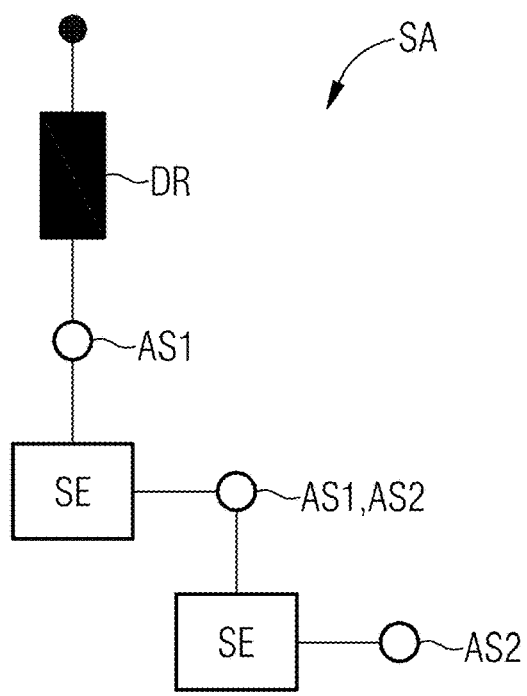

By contrast, the alternative embodiments of the switching arrangement SA of FIGS. 4C, 4D and 4E each comprise two switching units SE connected in series, wherein in turn due to the series connection, the inductance DR can alternatively be connected to the second terminal AS2 of the second and/or the, in the representation lower, switching unit SE, according to FIG. 4C, or to the second terminal AS2 of the first and/or upper switching unit SE and the first terminal AS1 of the second and/or lower switching unit SE, according to FIG. 4D, or to the first terminal AS1 of the first and/or upper switching unit SE, according to FIG. 4E.

Corresponding switching arrangements SA, each with more than two switching units SE connected in series and/or more than one inductance are also possible.

Figure 5A:
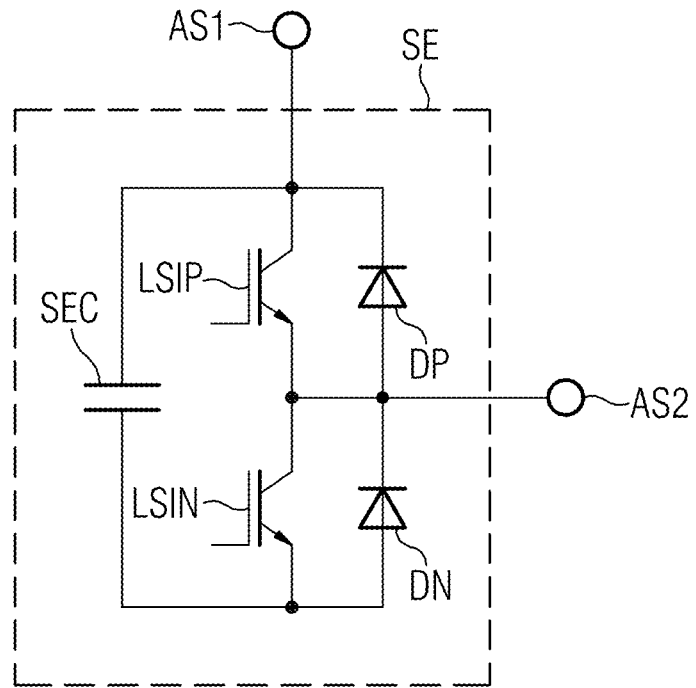
FIGS. 5A-5C are circuit diagrams showing alternative embodiments of switching facilities of the absorption circuit arrangement according to the invention.

FIG. 5 shows exemplary alternative embodiments of a switching unit SE of a switching arrangement SA of the absorption circuit arrangement SKA according to the invention. The switching unit SE of FIG. 5A therein contains a half-bridge with two power semiconductor switches LSIP, LSIN each of which is configured as an IGBT produced from a silicon semiconductor material. The power semiconductor switches LSIP, LSIN, in particular dependent upon the link circuit voltage UZK and the number of switching units SE of the switching arrangement SA connected in series have a nominal reverse withstand voltage of, for example, 1.2 kV, 1.7 kV, 2.3 kV, 3.3 kV, 4.5 kV or 6.5 kV. Switching settings of the power semiconductor switches LSIP, LSIN are controlled by the control facility ST at a switching frequency corresponding to a multiple of double the frequency of the supply network. Dependent upon the respective switching setting, a voltage of zero volt or a voltage corresponding to the voltage on the switching unit capacitance SEC of the switching unit SE can be applied to the terminals AS1, AS2 of the switching unit SE. The first terminal AS1 of the switching unit SE is therein connected to an outer terminal of the half-bridge and/or of the upper power semiconductor switch LSIP, whereas the second terminal AS2 of the switching unit SE is connected to the central terminal of the half-bridge.

A diode DP, DN connected anti-parallel and/or a freewheeling diode is associated with each of the power semiconductor switches LSIP, LSIN. The switching unit capacitance SEC connected in parallel with the half-bridge is configured, for example, as a film capacitor or electrolytic capacitor. For an increase in the capacitance of the switching unit capacitance SEC, for example, a plurality of such capacitors or alternatively additionally double-layer capacitors or battery cells are connected in parallel.

Figure 5B:
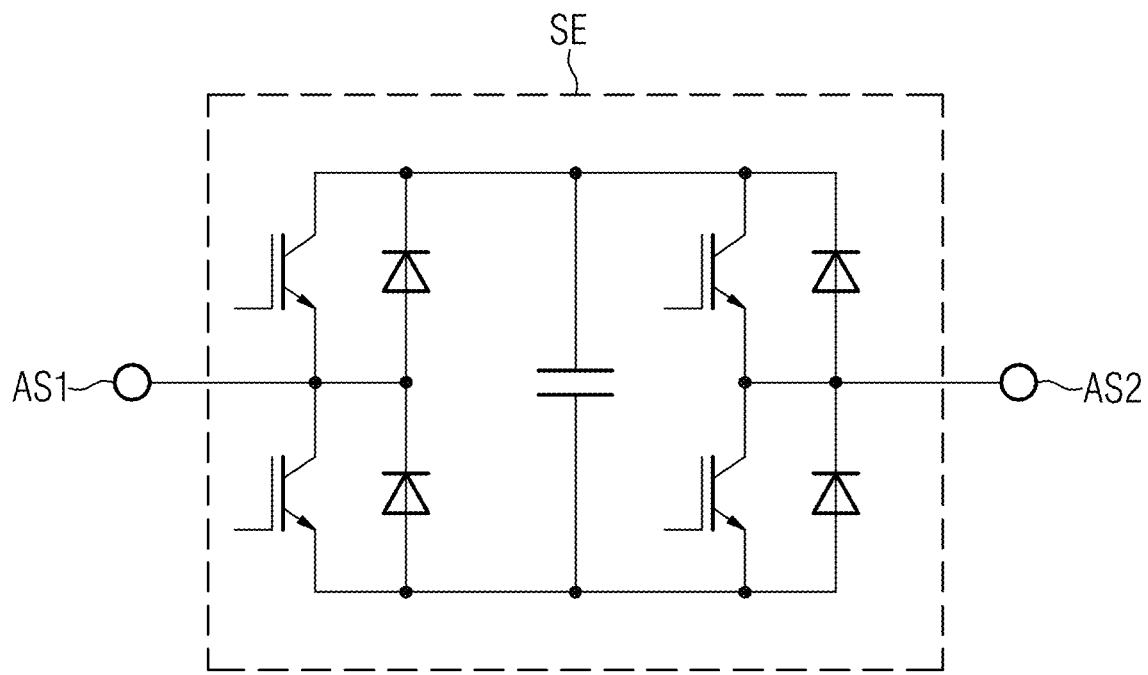

The alternative embodiment of the switching facility SE of FIG. 5B contains altogether four power semiconductor switches connected as a full-bridge, wherein at least two power semiconductor switches are connected, in each case, as a half-bridge, and two half-bridges and the at least one switching unit capacitance are connected in parallel. A diode and/or freewheeling diode is in turn connected anti-parallel with each power semiconductor switch. The first terminal AS1 of the switching unit SE is connected to the central terminal of the left-hand of the two half-bridges and the second terminal AS2 of the switching unit SE is connected to the central terminal of the right-hand of the two half-bridges.

Figure 5C:
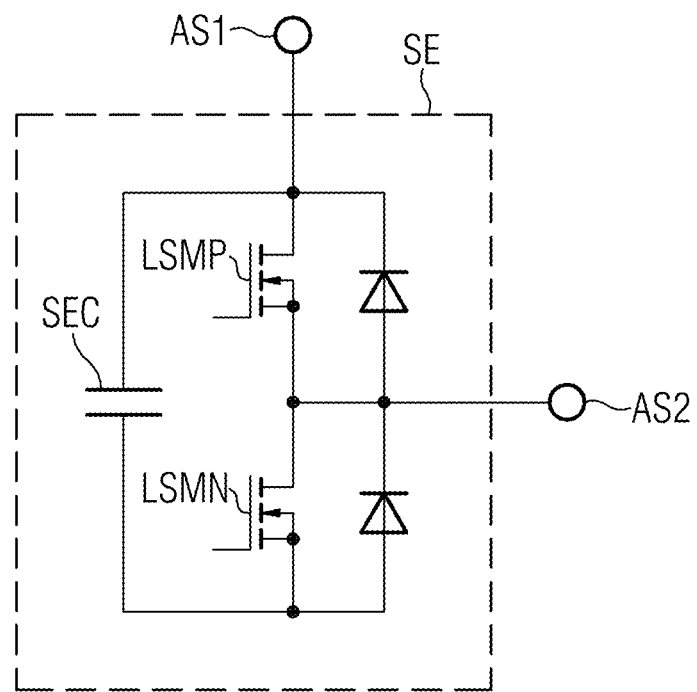

The alternative embodiment of the switching facility SE of FIG. 5C in turn comprises a half-bridge according to FIG. 5A, although with the difference that the power semiconductor switches LSMP, LSMN are each produced as a MOSFET made from a silicon carbide semiconductor material. The respectively anti-parallel connected diodes can be intrinsically contained within each MOSFET, or alternatively they can also be realized as separate components.

Figure 6:
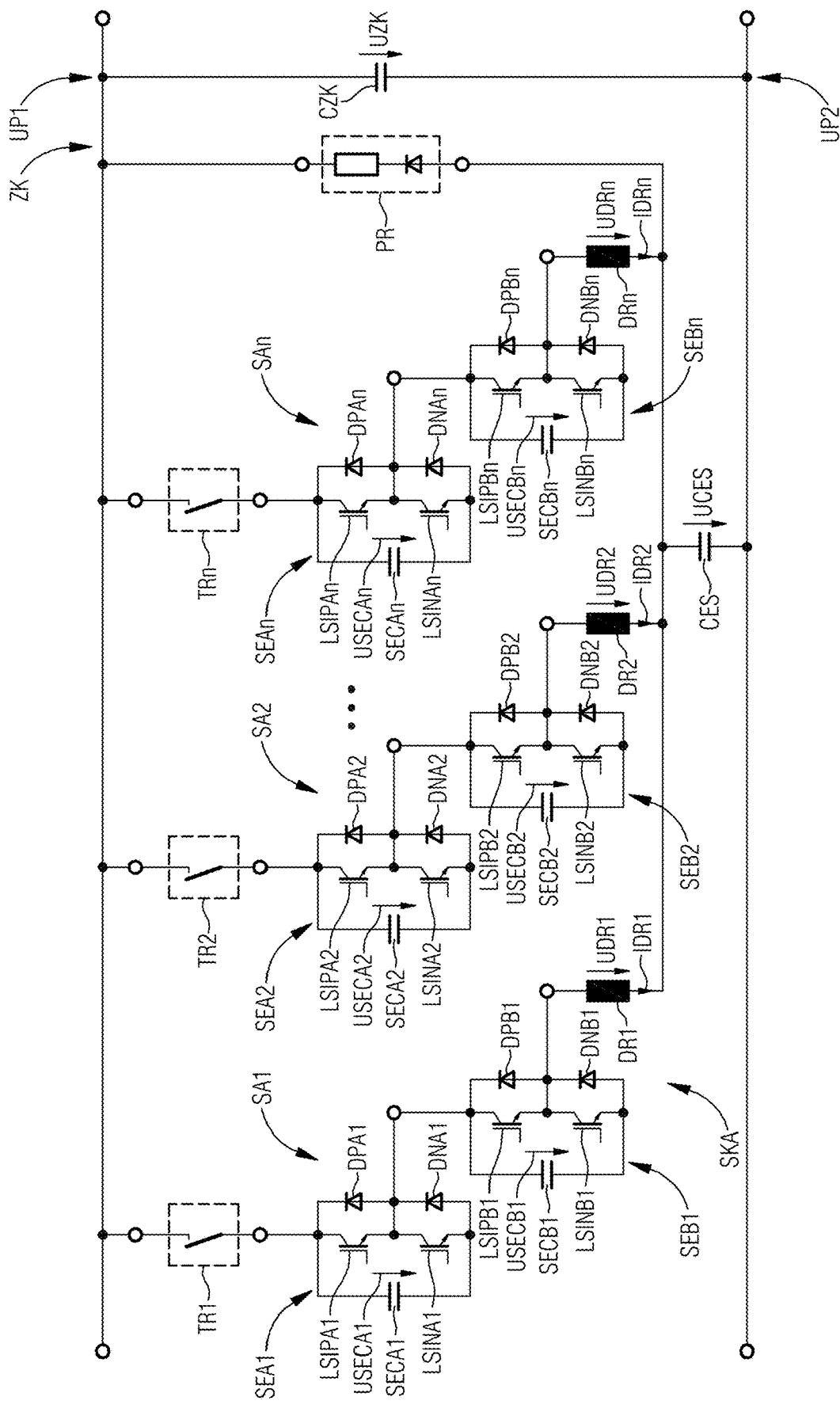
FIG. 6 is a circuit diagram showing an absorption circuit arrangement according to the invention having a plurality of switching arrangements each with two switching units, switches and a protective unit, in order to explain the function of the absorption circuit arrangement.

FIG. 6 shows an absorption circuit arrangement SKA according to the invention in a DC link circuit ZK. The absorption circuit arrangement SKA contains a number n of switching arrangements SAq connected in parallel, with q=1, 2, ..., n, and a capacitive energy store CES connected in series therewith, wherein the capacitive energy store CES can comprise, in particular, a plurality of parallel-connected capacitors according to the description above. Each of the switching arrangements SAq contains two switching units SEpq connected in series, with p=A or B, and an inductance DRq connected in series with the respective switching units SEpq. Therein, in accordance with FIG. 5A, the switching units SEpq each comprise a half-bridge with two power semiconductor switches LSIPpq, LSINpq configured as IGBTs and freewheeling diodes DPpq connected antiparallel with these. Furthermore, the switching units SEpq each comprise a switching unit capacitance SECpq connected in parallel with the half-bridge. With a link circuit voltage UZK in a region between typically 1.2 kV and 2.2 kV, the power semiconductor switches LSIPpq, LSINpq have a reverse withstand voltage of, for example, 1.2 kV or 1.7 kV and the switching unit capacitances SECpq have a withstand voltage in the region between 700 V and 1.2 kV.

In addition, the absorption circuit arrangement SKA of FIG. 6 has a switch TRq connected in series with a respective switching arrangement SAq. These switches TRq are each configured, for example, as a circuit-breaker or a disconnector switch and enable the separation of a respective switching arrangement SAq from the DC link circuit ZK. On occurrence of a fault, for example, in a component of the first switching arrangement SA1, the operation of the absorption circuit arrangement SKA can thereby be continued with the further switching arrangements SA2 to SAn. Furthermore, the absorption circuit arrangement SKA comprises a protective unit PR connected in parallel with the switching arrangements SAq in order to divert a surge current occurring, for example, due to a short-circuit in the DC link circuit ZK and/or a collapse of the link circuit voltage and a discharging of the link circuit capacitance thereby brought about, in particular past the freewheeling diodes DPpq, DNpq of the switching units SEpq. The protective unit PR comprises, for example, a series connection of a mains diode and a resistance, in particular having an ohmic resistance value of between 2 and 200 milliohm.

In accordance with FIG. 6, a first voltage potential UP1 of the DC link circuit ZK is assumed to be positive and a second voltage potential UP2 is assumed to be negative. A current IDRq through an inductance DRq is positive if it flows from the direction of the positive first voltage potential UP1 in the direction of the negative second voltage potential UP2 of the DC link circuit ZK. Similarly, a voltage UDRq on an inductance DRq is positive if it is oriented from the positive first voltage potential UP1 to the negative second voltage potential UP2 and a voltage USECpq on a switching capacitance SEpq is positive if it is oriented from the first terminal AS1 to the second terminal AS2 of the switching unit SEpq.

The following Table A shows switching states controlled by the control facility ST (not shown in FIG. 6) of the four power semiconductor switches LSIPpq, LSINpq of the two switching units SEAq, SEBq of a switching arrangement SAq, as well as a corresponding state for a respective combination of switching states. The switching state 1 therein denotes a transmission, whereas the switching state 0 denotes a blocking.

TABLE A

| | Switching state | | | |
|---|---|---|---|---|
| State | LSIPAq | LSINAq | LSIPBq | LSINBq |
| Z1q | 1 | 0 | 1 | 0 |
| Z2Aq | 0 | 1 | 1 | 0 |
| Z2Bq | 1 | 0 | 0 | 1 |
| Z3q | 0 | 1 | 0 | 1 |

If none of the power semiconductor switches LSIPpq, LSINpq of a switching unit SEpq is switched on and if a positive non-zero current IDRq flows through the inductance DRq, the diode DNpq becomes conductive, which has the same effect as the switching on of the power semiconductor switch LSINpq. If a non-zero negative current IDRq flows through the inductance DRq, the diode DNpq becomes conductive accordingly, which has the same effect as the switching on of the power semiconductor switch LSIPpq.

Table B shows a voltage UDRq, resulting from the selected state, on the inductance DRq of a switching arrangement SAq and a corresponding effect on the voltage USECAq, USECBq on the switching unit capacitances SECAq, SECBq of the two switching units SEAq, SEBq dependent upon the direction of the current IDRq through the inductance DRq.

TABLE B

| | | Effect | |
|---|---|---|---|
| State | UDRq | IDRq < 0 | IDRq > 0 |
| Z1q | UZK − UCES | No change | No change |
| Z2Aq | UZK − UCES − USECAq | Discharge SECAq | Charge SECAq |
| Z2Bq | UZK − UCES − USECBq | Discharge SECBq | Charge SECBq |

TABLE B-continued

| | | Effect | |
|---|---|---|---|
| State | UDRq | IDRq < 0 | IDRq > 0 |
| Z3q | UZK − UCES − USECAq − USECBq | Discharge SECAq + SECBq | Charge SECAq + SECBq |

If the voltages USECAq, USECBq on the switching unit capacitances SECAq, SECBq of the two switching units SEAq, SEBq of the switching arrangement SAq are regarded as identical and/or only different by a few volts or percentage points, both can be denoted with USECCq. In order to obtain a state of the same voltages USECAq, USECBq on the switching unit capacitances SECAq, SECBq, changing back and forth takes place at the selected switching frequency between the states Z1q and Z2pq or between Z3q and Z2pq. The state Z2pq therein results according to the following Table C. According to this table, the state is selected which causes the voltages USECAq, USECBq on the switching unit capacitances to approach one another.

TABLE C

| | IDRq < 0 | | IDRq > 0 | |
|---|---|---|---|---|
| State for | USECAq < USECBq | USECAq > USECBq | USECAq < USECBq | USECAq > USECBq |
| Z2pq | Z2Bq | Z2Aq | Z2Aq | Z2Bq |

The following Table D shows which state and/or which switching state combination is selected in order to set a positive or a negative voltage UDRq on the inductance DRq of the switching arrangement SAq.

TABLE D

| Condition for UZK | |
|---|---|
| UZK > UCES + (2 * USECCq) | No switching, charging CES and SECpq via DNpq |
| UCES + (2 * USECCq) > UZK > UCES + USECCq | Switching between Z1q and Z2pq |
| UCES + USECCq > UZK > UCES | Switching between Z3q and Z2pq |
| UZK < UCES | No switching, discharging of CES via PR and DPpq |

For the second condition of Table D, UCES+(2*USECCq)>UZK>UCES, the switching states result in a rising or a falling of the current IDRq through the inductance DRq. By way of a suitable selection of the duty factor of the switching states by way of the control facility, a pattern of the current IDRq can be influenced in accordance with a desired target value.

Figure 7:
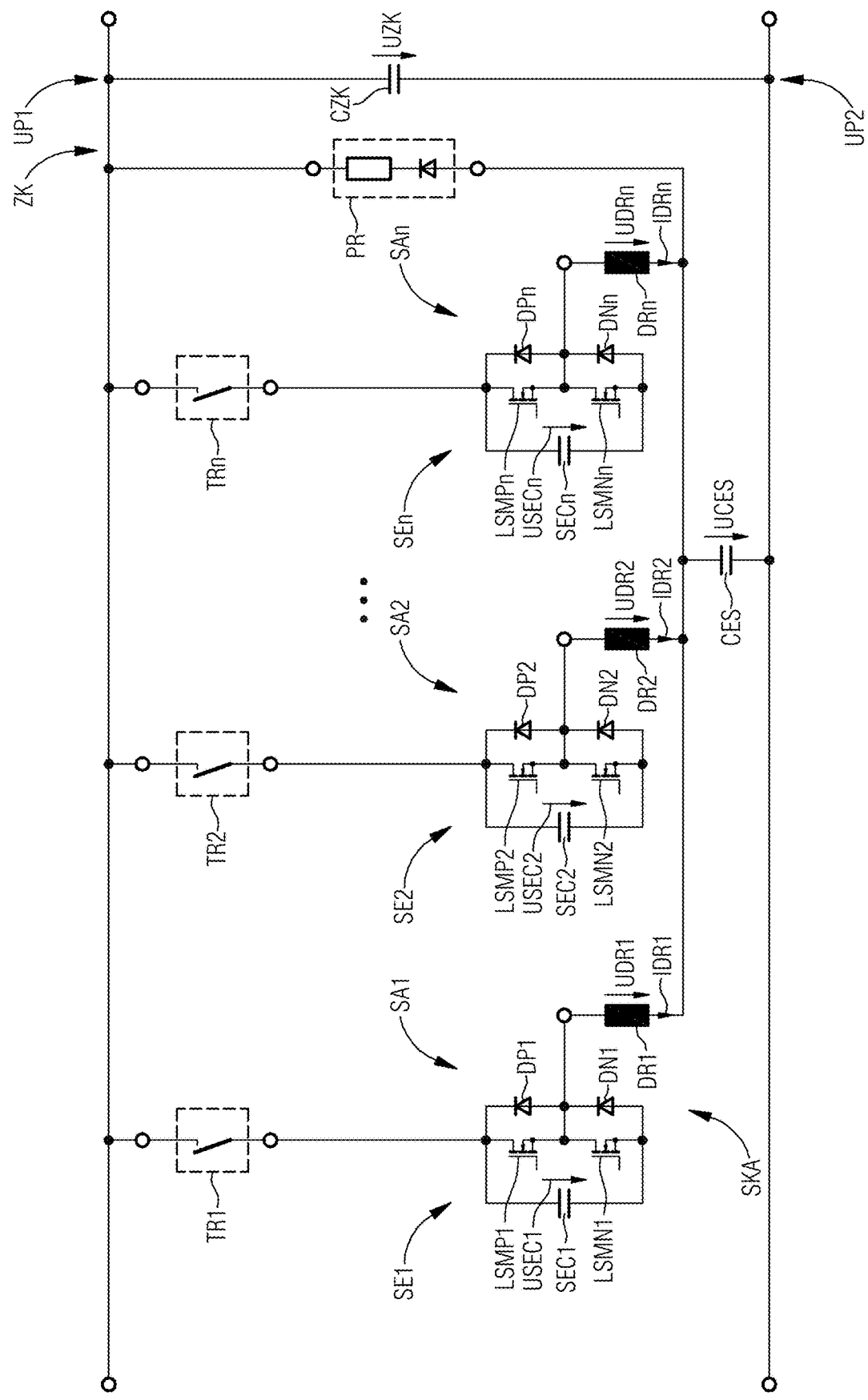
FIG. 7 is a circuit diagram showing a further absorption circuit arrangement according to the invention having a plurality of switching arrangements each with one switching unit.

FIG. 7 shows an alternative absorption circuit arrangement SKA according to the invention in a DC link circuit ZK. The absorption circuit arrangement SKA in turn contains a number n of switching arrangements SAq connected in parallel, with q=1, 2, . . . , n, and an energy store CES connected in series therewith. In contrast to the absorption circuit arrangement SKA of FIG. 6, each of the switching arrangements SAq comprises just one switching unit SEq and an inductance DRq connected in series with the respective switching unit SEq. Therein, in accordance with FIG. 5C, the switching units SEq each comprise a half-bridge with two power semiconductor switches LSMPq, LSMNq each configured as a MOSFET and freewheeling diodes DPq, DNq connected antiparallel with these. The freewheeling diodes can therein be configured as intrinsically contained within the MOSFET and/or as separate components. Furthermore, the switching units SEq each comprise a switching unit capacitance SECq connected in parallel with the half-bridge. With a link circuit voltage UZK in a region between typically 1.2 kV and 2.2 kV, the power semiconductor switches LSMPq, LSMNq have a reverse withstand voltage of, for example, in the region between 1.2 kV and 3.3 kV and the switching unit capacitances SECq have a withstand voltage in the region between 700 V and 1.6 kV.

In accordance with the absorption circuit arrangement of FIG. 6, the absorption circuit arrangement SKA of FIG. 7 has a switch TRq connected in series with a respective switching arrangement SAq. These switches TRq are each configured, for example, as a circuit-breaker or a disconnector switch and enable the separation of a respective switching arrangement SAq from the DC link circuit ZK. On occurrence of a fault, for example, in a component of the first switching arrangement SA1, the operation of the absorption circuit arrangement SKA can thereby be continued with the further switching arrangements SA2 to SAn. Furthermore, the absorption circuit arrangement SKA in turn comprises a protective unit PR connected in parallel with the switching arrangements SAq in order to divert a surge current occurring, for example, due to a short-circuit in the DC link circuit ZK, past the freewheeling diodes DPq of the switching units SEq. The protective unit PR comprises, for example, a series connection of a mains diode and a resistance, in particular, having an ohmic resistance value of between 2 and 200 milliohm.

The control of the power semiconductor switches LSMPq, LSMNq of the switching facility SEq by the control facility ST largely corresponds to the control system described in relation to FIG. 6. Since each switching arrangement SAq has only one switching unit, a balancing of the voltages on the switching unit capacitances of a switching arrangement, as set out in table C above, is however not necessary.

The following Table E shows switching states, controlled by the control facility ST, of the two power semiconductor switches LSMPq, LSMNq of the switching unit SEq of the switching arrangement SAq and a corresponding state for a respective combination of switching states. The switching state 1 therein denotes a transmission, whereas the switching state 0 denotes a blocking.

TABLE E

| | Switching state | |
|---|---|---|
| State | LSMPq | LSMNq |
| Z1q | 1 | 0 |
| Z3q | 0 | 1 |

Table F shows a voltage UDRq, resulting from the selected state, on the inductance DRq of a switching arrangement SAq and a corresponding effect on the voltage USECq on the switching unit capacitance SECq of the switching unit SEq dependent upon the direction of the current IDRq through the inductance DRq.

TABLE F

| | | Effect | |
|---|---|---|---|
| State | UDRq | IDRq < 0 | IDRq > 0 |
| Z1q | UZK − UCES | No change | No change |
| Z3q | UZK − UCES − USECq | Discharge SECq | Charge SECq |

If none of the power semiconductor switches LSMPq, LSINq of a switching unit SEq is switched on and if a positive non-zero current IDRq flows through the inductance DRq, the diode DNq becomes conductive, which has the same effect as the switching on of the power semiconductor switch LSMNq. If a non-zero negative current IDRq flows through the inductance DRq, the diode DPq becomes conductive accordingly, which has the same effect as the switching on of the power semiconductor switch LSMPq.

Finally, Table G shows which state and/or which switching state combination is selected in order to set a positive or a negative voltage UDRq on the inductance DRq of the switching arrangement SAq.

TABLE G

| Condition for UZK | |
|---|---|
| UZK > UCES + USECq | No switching, charging CES and SECq via DNq |
| UCES + USECq > UZK > UCES | Switching between Z1q and Z3q |
| UZK < UCES | No switching, discharging of CES via PR and DPq |

For the second condition of table G, UCES+USECq>UZK>UCES, there result the switching states in a rising or a falling of the current IDRq through the inductance DRq. By way of a suitable selection of the duty factor of the switching states by way of the control facility, a pattern of the current IDRq can be influenced in accordance with a desired target value.

Apart from the absorption circuit arrangements SKA described in relation to FIGS. 6 and 7, further embodiments of an absorption circuit arrangement according to the invention are conceivable. They can comprise, in particular, only a single switching arrangement SA with one or more switching units SE connected in series. A protection for the diodes of a switching unit against surge currents can also be achieved in another manner than by way of a protective unit PR as described, for example, by way of a unit connected in series with a switching unit which, if the current exceeds a predetermined threshold value or an integration of the current over a specified period, interrupts the current flow through the switching unit and/or diverts the current flow via one or more current paths of low impedance past the switching units and/or past particular components of these switching units.

The following is a summary list of reference numerals and the corresponding structure used in the above description of the invention:
AS1, AS2 Switching unit terminals
CES Captive energy store
CZK Link circuit capacitance
DP, DN Diode, freewheeling diode
DR Inductance
EW End car
EW End car
FR Direction of travel
IDRq Current through inductance
LDG Unpowered bogie LSIP, LSIN, LSMP,
LSMN, LSIPpq, LSINpq,
LSMPq, LSMNq Power semiconductor switch
LSR Load-side second power converter
MW Middle car
NSR Supply-side first power converter
PAN Current collector
PR Protective unit
SA, SAq Switching arrangement
SE, SEq, SEpq Switching unit
SEC, SECq,
SECpq Switching unit capacitance
SEN Sensors
SKA Absorption circuit arrangement
ST Control facility
TDG Motor bogie
TF Traction transformer facility, traction transformer
TM Traction motor
TR1-TRn Switches
TS Traction system
TUR Traction converter
TZ Rail vehicle
UCES Voltage on captive energy store
UDRq Voltage on inductance
UP1, UP2 First and/or second voltage potential
USECq, USECpq Voltage on switching unit capacitance
UZK Link circuit voltage
ZK DC link circuit

The invention claimed is:

1. An absorption circuit configuration for a traction converter of a rail vehicle, the traction converter having at least one supply-side first power converter, at least one load-side second power converter, a DC link circuit connecting the at least one supply-side first power converter and the at least one load-side second power converter with a first and a second voltage potential and at least one link circuit capacitance disposed in the DC link circuit, the absorption circuit configuration disposed in the DC link circuit and connected in parallel with the at least one link circuit capacitance, the absorption circuit comprising:
at least one switching configuration having at least one switching unit and at least one inductance, wherein each said at least one switching unit has two terminals, at least two controllable power semiconductor switches and at least one switching unit capacitance and is configured, dependent upon switching settings of said controllable power semiconductor switches, to provide at least two different voltages at said two terminals, and wherein said at least one inductance is connected in series with said at least one switching unit;
at least one capacitive energy store, wherein said at least one capacitive energy store is connected in series with said at least one switching configuration; and
a controller, wherein said controller is configured to control at least said controllable power semiconductor switches of said at least one switching unit.

2. The absorption circuit configuration according to claim 1, wherein:
said two terminals of said at least one switching unit include a first terminal and a second terminal, said first terminal of each said at least one switching unit is alternatively connected to said second terminal of a further said at least one switching unit, to the first voltage potential of the DC link circuit, to said at least one inductance of said at least one switching configuration or to said at least one capacitive energy store of the absorption circuit configuration; and
said second terminal of each said at least one switching unit is alternatively connected to said first terminal of said further switching unit, to the second voltage potential of the DC link circuit, to said at least one inductance of said at least one switching configuration or to said at least one capacitive energy store of the absorption circuit configuration.

3. The absorption circuit configuration according to claim 1, wherein:
said at least one switching unit has said at least two controllable power semiconductor switches connected as a half-bridge having an outer terminal and a central terminal, said half-bridge and said at least one switching unit capacitance are connected in parallel; and
said two terminals of said at least one switching unit include a first terminal and a second terminal, said first terminal of said at least one switching unit is connected to said outer terminal of said half-bridge and said second terminal of said at least one switching unit is connected to said central terminal of said half-bridge.

4. The absorption circuit configuration according to claim 1, wherein:
said at least one switching unit has at least four said controllable power semiconductor switches connected as a full-bridge having two half-bridges, wherein at least two of said controllable power semiconductor switches are connected as a respective one of said half-bridges having a central terminal, and said two half-bridges and said at least one switching unit capacitance are connected in parallel; and
said two terminals of said at least one switching unit include a first terminal and a second terminal, said first terminal of said at least one switching unit is connected to said central terminal of one of said two half-bridges and said second terminal of said at least one switching unit is connected to said central terminal of another of said two half-bridges.

5. The absorption circuit configuration according to claim 1, wherein said at least one switching configuration is one of a plurality of switching configurations, at least two of said switching configurations are connected in parallel and said switching configurations are connected in series with said at least one capacitive energy store.

6. The absorption circuit configuration according to claim 1, further comprising at least one protective unit, wherein said at least one protective unit is connected in parallel with said at least one switching configuration and wherein said at least one protective unit is configured to divert a surge current flowing through the absorption circuit configuration past said at least one switching configuration.

7. The absorption circuit configuration according to claim 1, further comprising at least one further switch, wherein each said at least one further switch is associated with at least one said switching configuration and wherein each said at least one further switch is configured to disconnect a current path through the associated said at least one switching configuration.

8. The absorption circuit configuration according to claim 7, wherein each said at least one further switch is configured to disconnect the current path through the associated said at least one switching configuration to a connection to the DC link circuit or said at least one capacitive energy store.

9. A rail vehicle, comprising:
at least one current collector;
at least one traction transformer facility being able to be connected via said at least one current collector to an AC voltage supply network;

at least one traction converter having at least one supply-side first power converter, at least one load-side second power converter, a DC link circuit connecting said at least one supply-side first power converter and said at least one load-side second power converter and at least one link circuit capacitance disposed in said DC link circuit;

at least one traction motor connected to said at least one load-side second power converter;

said absorption circuit configuration according to claim 1 disposed in said in said DC link circuit of said at least one traction converter; and said controller configured to control at least said controllable power semiconductor switches of said absorption circuit configuration.

10. The rail vehicle according to claim 9, wherein the rail vehicle is configured as a multiple unit train or as a locomotive.

11. The rail vehicle according to claim 9, wherein said at least one supply-side first power converter is configured as a self-regulated pulsed-controlled converter and said at least one load-side second power converter is configured as a self-commutated pulse-controlled converter.

12. The rail vehicle according to claim 10, wherein the multiple unit train is for regional and long-distance traffic.

13. The rail vehicle according to claim 11, wherein said self-regulated pulse-controlled converter is a four-quadrant controller and said self-commutated pulse-controlled converter is a pulse-controlled inverter.

14. A method for controlling the absorption circuit configuration according to claim 1, which comprises the steps of:

controlling the controllable power semiconductor switches of the at least one switching unit via the controller such that, from a current flow generated by means of the absorption circuit configuration, a compensation of at least one harmonic of a mains frequency impressed upon the DC link circuit is brought about.

15. The method according to claim 14, which further comprises controlling the controllable power semiconductor switches via the controller such that state variables including voltages on the at least one switching unit capacitance and currents through the at least one inductance of the at least one switching configuration and voltages on the at least one capacitive energy store of the absorption circuit configuration are tracked with regard to specified target values.

16. The method according to claim 15, wherein provided a link circuit voltage determined by the controller lies within specified threshold values and/or a target current through the at least one inductance lies within specified threshold values, a control of the controllable power semiconductor switches is discontinued by the controller.

17. The method according to claim 14, wherein with at least two switching configurations connected in parallel, the controllable power semiconductor switches are driven by the controller such that harmonics of currents in the switching configurations at least partially cancel each other out.

18. The method according to claim 17, wherein the controllable power semiconductor switches are driven by the controller phase-offset.

19. A method of configuring a rail vehicle, which comprises the steps of:

providing the absorption circuit configuration according to claim 1 in a traction converter of the rail vehicle.

* * * * *